United States Patent [19]
Brown

[11] 4,101,252
[45] Jul. 18, 1978

[54] SHEET SUPPORT APPARATUS

[75] Inventor: Gaylord William Brown, Beaverton, Mich.

[73] Assignee: Sweetheart Plastic, Inc., Beaverton, Mich.

[21] Appl. No.: 686,301

[22] Filed: May 14, 1976

[51] Int. Cl.² ............................................. B29C 17/00
[52] U.S. Cl. .................................. 425/394; 425/384; 425/397
[58] Field of Search ................. 425/397, 387 B, 387.1, 425/394, 384, 395, 398, 383

[56] References Cited
U.S. PATENT DOCUMENTS

| 3,193,599 | 7/1965 | Crilly | 425/397 X |
| 3,216,491 | 11/1965 | Brown | 165/120 X |
| 3,583,036 | 6/1971 | Brown | 425/395 X |
| 3,664,791 | 5/1972 | Brown | 425/397 X |

Primary Examiner—Richard B. Lazarus

[57] ABSTRACT

Sheet supporting apparatus for a continuous sheet, differential pressure thermoforming machine comprising laterally spaced apart sheet support members for supporting the lateral edges of a formable sheet and for moving the sheet in a forward path of travel. The apparatus includes an open top, air receiving, sheet support box disposed interjacent the laterally spaced sheet support members upstream of a differential pressure mold, and mechanism for introducing air under pressure to the inside of the box for supporting a midportion of the sheet of plastic.

11 Claims, 4 Drawing Figures

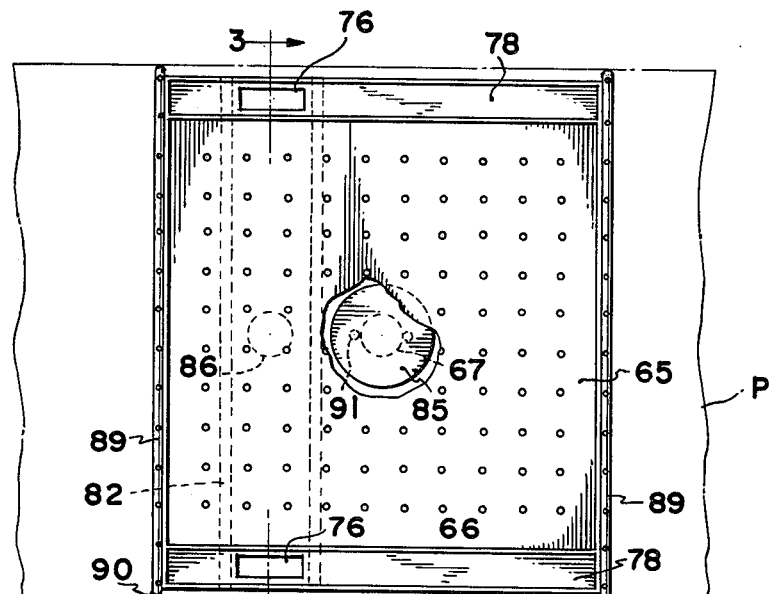
FIG.2
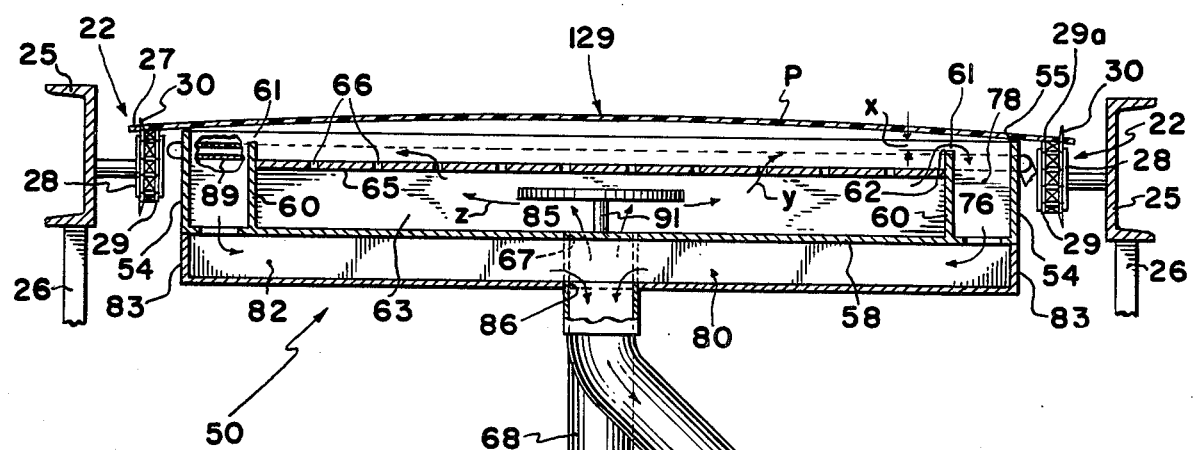
FIG.3
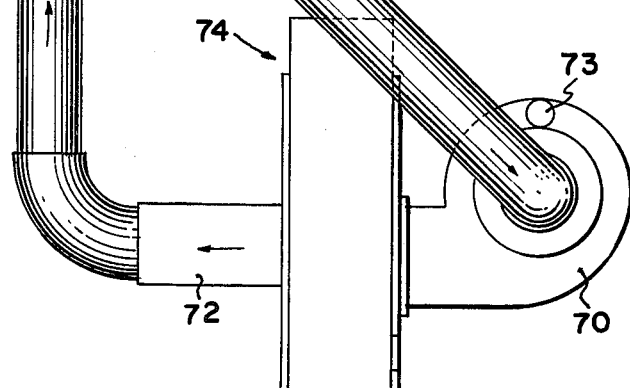

SHEET SUPPORT APPARATUS

BACKGROUND OF THE INVENTION

This invention relates to differential pressure thermoforming apparatus and more particularly to sheet support apparatus for preventing undue sagging of a plastic sheet proceeding through heating apparatus to a forming mold station.

In continuous sheet, differential pressure, thermoforming machines, one of the problems encountered is that the material sags at a heating station before it reaches the mold station.

Thin sheets of thermoplastic material have relatively little "hot strength." When a thin sheet of thermoplastic material is clamped along its edges and is used for forming relatively large areas of parts, the strength of the heated, thermoplastic material is insufficient to support the midportion of the sheet.

One previous system for inhibiting sagging comprises the use of longitudinally extending, endless sag bands for supporting the midportion of the web or sheet in the manner disclosed in U.S. Pat. No. 2,967,328. One other practice which has been employed to inhibit sagging incorporates integral support strips or ribs in the sheet of plastic as disclosed in U.S. Pat. No. 3,664,791 issued May 23, 1972 to Gaylord W. Brown.

Presently the side edges of a plastic sheet are gripped and conveyed by advancing chains as described in U.S. Pat. No. 3,216,491 issued Nov. 9, 1965 for Plastic Sheet Conveying Apparatus. The continuous sheet or web of plastic is heated to thermoforming temperatures prior to reaching the mold station. Thermoforming machines are now being built wider than the previous machines to reach higher productive levels. The increased width of the theroforming machine and the increased sheet width has exaserbated the tendency of the sheets to sag under their own weight after reaching thermoforming temperatures. Accordingly, it is an object of the present invention to provide apparatus for supporting a portion of a sheet of plastic after it has been heated to thermoforming temperature but before the heated sheet portion reaches the mold station.

It is another object of the present invention to provide an air receiving, sheet support box directly underneath the plastic sheet in the last indexing station before the heated portion of the sheet reaches the mold station.

Still another object of the present invention to provide an air receiving, sheet support box which receives recirculated, pressurized fluid to support a portion of a formable plastic sheet in a reasonably planar condition while the sheet is receiving the final heat treatment, in the last heating station before reaching the mold.

It is a further object of the present invention to provide, underneath the sheet, sheet support apparatus comprising box frame means which receives pressurized, heated air for supporting the sheet.

A still further object of the present invention is to provide sheet support apparatus including a box frame which receives pressurized fluid and mechanism for controlling the temperature of the pressurized fluid at or slightly below the forming temperature of the plastic sheet being run. By controlling the temperature of the pressurized fluid at a temperature slightly below the forming temperature of the sheet it is possible to form a cooler skin on the underside of the sheet. This provides advantages when a mechanical plug assist is utilized in forming a deep drawn part. Accordingly, it is another object of the present invention to provide sheet support apparatus which will form a cooler skin on one side thereof.

It is yet another object of the present invention to provide sheet support apparatus for a continuous sheet differential pressure thermoforming machine including laterally extending, longitudinally spaced pressurized fluid receiving sheet support members for supporting longitudinally spaced portions of the sheet, and mechanism for introducing fluid to the longitudinally spaced sheet support members only while the sheet is being indexed.

A further object of the present invention is to provide a differential pressure thermoforming machine including laterally spaced apart, movable sheet support members for supporting the lateral edges of a continuous sheet and moving the sheet in a forward path of travel and stationary, pressurized fluid introducing mechanism interjacent the laterally spaced apart sheet support members for supporting the midportion of the sheet supported by the laterally spaced sheet support members.

Other objects and advantages of the present invention will become apparent to those of ordinary skill in the art as the description thereof proceeds.

SUMMARY OF THE INVENTION

Sheet support apparatus for a continuous sheet, differential pressure thermoforming machine comprising a frame; mold mechanism for forming parts in a continuous sheet of thermoplastic material; mechanism for heating the sheet upstream of the mold; laterally spaced apart sheet support members movably mounted on the frame for supporting the lateral edges of the sheet and for moving the sheet in a forward path of travel from the heating station to the mold station; and mechanism for introducing fluid under pressure in an upward direction between the laterally spaced apart support members to the underside of the heated sheet to support the midportion of the heated sheet before the heated portion of the sheet reaches the mold station.

This invention shall hereafter be more fully disclosed with reference to the accompanying drawings in which:

FIG. 2 is a fragmentary, top plan view, taken along the line 2—2 of FIG. 1 and particularly illustrating the recirculating air, receiving sheet support box constructed according to the present invention, parts being broken away to more clearly illustrate underlying parts thereof;

FIG. 3 is an enlarged sectional end view, taken along the line 3—3 of FIG. 2.

DESCRIPTION

Figure 1:
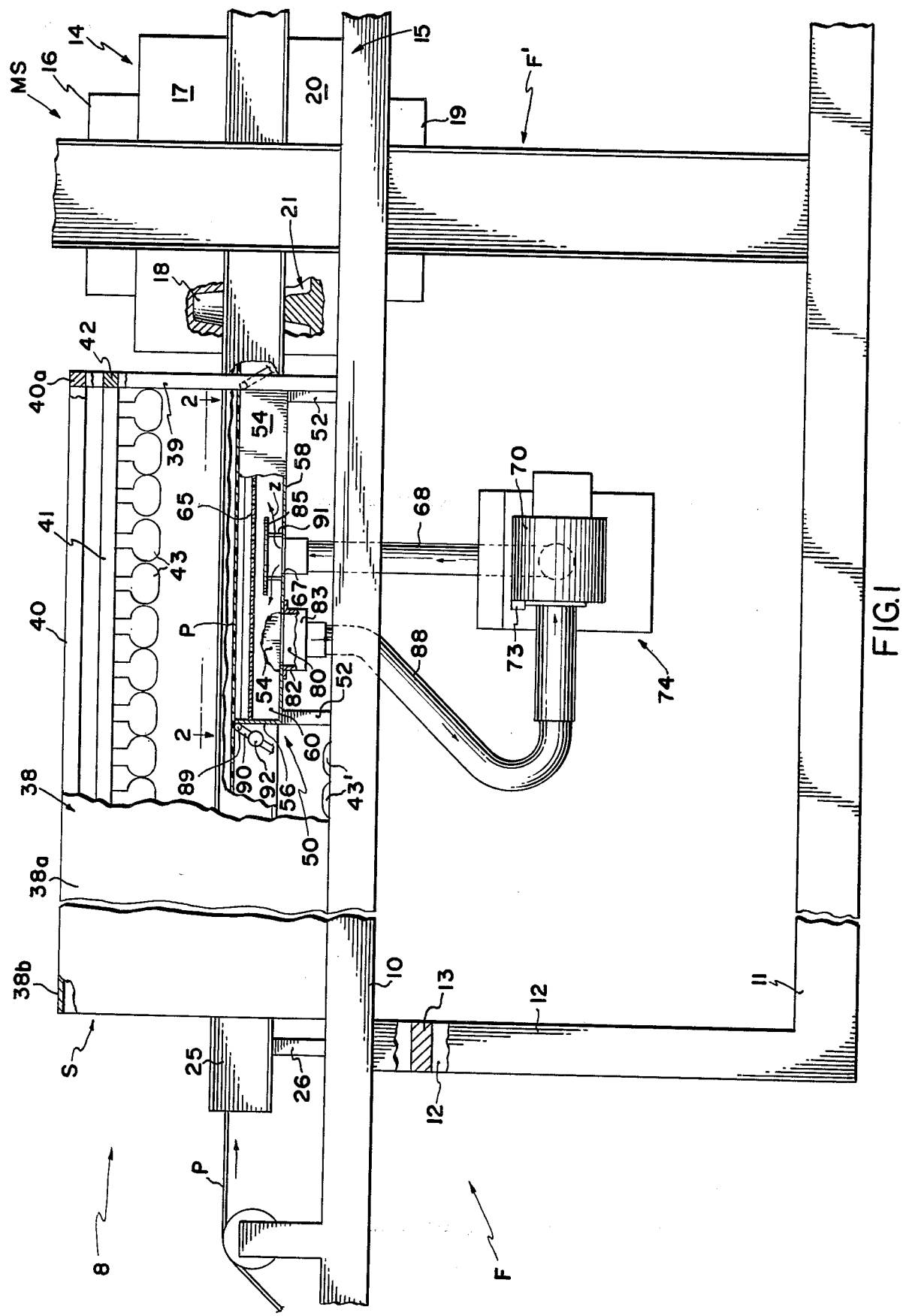
FIG. 1 is a side elevational view of a differential pressure thermoforming machine incorporating apparatus constructed according to the present invention, parts of the machine being broken away to more clearly illustrate portions of the present invention.

Apparatus constructed according to the present invention is particularly adapted for use with a differential pressure thermoforming machine, generally designated 8, which is generally similar to that described in U.S. Pat. No. 3,364,923 issued Oct. 17, 1967, and U.S. Pat. No. 3,664,791 issued May 23, 1972, both of said patents being incorporated herein by reference. The apparatus 8 includes a frame, generally designated F, comprising upper and lower longitudinal frame members 10 and 11 respectively, joined at their ends by front and rear vertical members 12. The end members 12 on each side of the machine are joined by cross braces 13 in the usual fashion.

Mounted on the prefabricated frame F is a platen supporting subframe, generally designated F', which may be of the character disclosed in the aforementioned U.S. Pat. No. 3,346,923. The front frame F' mounts, at a mold station M,S an upper mold assembly, generally designated 14, and a lower mold assembly, generally designated 15. More specifically the upper mold assembly 14 includes an upper platen 16 and a female mold 17 having a mold cavity 18. The lower mold assembly 15 comprises a lower platen 19 which mounts an air box 20 having plug assist members 21, in the manner illustrated in U.S. Pat. No. 3,346,923.

As described in the aforementioned U.S. Pat. No. 3,664,791, the subframe F' mounts fluid pressure operated cylinders which move the platens 16 and 19 toward and away from a continuous plastic sheet P which is indexed between the mold assemblies 14 and 16 when the mold assemblies are in separated positions in a manner which will later become apparent. Apparatus, generally designated 22, (FIG. 3) is provided for moving the plastic web or sheet P through the thermoforming machine and is disclosed more particularly in U.S. Pat. No. 3,216,491 issued Nov. 9, 1965, and incorporated herein by reference. The sheet conveying and support apparatus 22 comprises side rail support members 25 mounted on the frame F by vertical support bars 26. Sprocket wheels 28 are journalled on the side rail support members 25 in the manner described in U.S. Pat. No. 3,216,491. Endless chains 29, trained around the sprocket wheels 28, mount longitudinally spaced apart, plastic sheet penetrating pins 30 which are forced through the plastic web P at the lateral side edges 27 thereof and operate to advance the sheet P in predetermined increments of travel when the chain 30 is indexed in the usual manner as more particularly described in U.S. Pat. No. 3,364,791 and U.S. Pat. No. 3,217,852.

The apparatus for indexing the plastic sheet P operates in timed relation with the mold assembly operating assemblies as described in the referenced U.S. Pat. No. 3,364,791. The sheet is advanced when the molds 14 and 15 are separated.

Mounted on the frame F, upstream of the mold station M,S is a plastic sheet heating oven, generally designated 38, (FIG. 1) which includes a skeletal framework S, having vertical supports 39 mounting upper longitudinal members 40 which are spanned by transverse brace members 40a. Heater support bars 41 are mounted on the cross supports 42 spanning the vertical supports 39. A plurality of stationary, electrically energized radiant heating elements 43 depend from the cross supports 42. At the lower end of the oven, upwardly extending, electrically energized, radiant heating elements 43' are mounted in a stationary position along the upstream portion of the frame F in opposed relation with the overlying heating elements 43. As described in the referenced U.S. Pat. No. 3,664,791, the skeletal frame S of the oven is covered by sidewalls comprising enclosing side members 38a and a top wall or roof 38b forming a tunnel having open inlet and outlet ends.

THE RECIRCULATING AIR SHEET SUPPORT BOX

An open top, recirculating air, sheet support box, generally designated 50, is stationarily mounted on the side rails 10 via support bars 52 at the last index station immediately upstream of the mold station MS. The recirculating air box 50 is sealed and includes vertical sidewalls 54 spanning vertical end walls 56. The upper edges 55 of the sidewalls 54 are at a level slightly below the upper side of the upper runs 29a of the endless chains 29. A bottom closure wall 58 spans and is sealed to the sidewalls 54 and to the end walls 56. Mounted on the bottom wall 58, inwardly of the sidewalls 54 and spanning the end walls 56, is a pair of upstanding, lateral sidewalls 60. The sidewalls 60 and bottom wall 58 define an air receiving chamber 63 for receiving pressurized sheet billowing air and the parallel sidewalls 54 and 60 define air return channels 78. The upper edges 62 of the sidewalls 60 are a distance X below the upper edges of the sidewalls 54, to provide air return channels or passages 61 for a purpose to communicate the pressurized billowing air in chamber 63 to the air return channels 78. A perforated "false bottom" wall 65 spans the sidewall members 60 and endwalls 56 and includes a plurality of air passages 66 therethrough for upwardly passing pressurized air in the direction of the arrows y.

Pressurized air is admitted to the chamber 63 of the sheet support box 50 via an air supply tube 68 received in an opening 67 in the bottom box wall 58. The air supply tube 68 is coupled to an air blower 70 via a tube 72. Connected in series in the tube 72 is an electric heater 74. A Chromolox, duct type, electric heater has been found satisfactory for this purpose.

Figure 4:
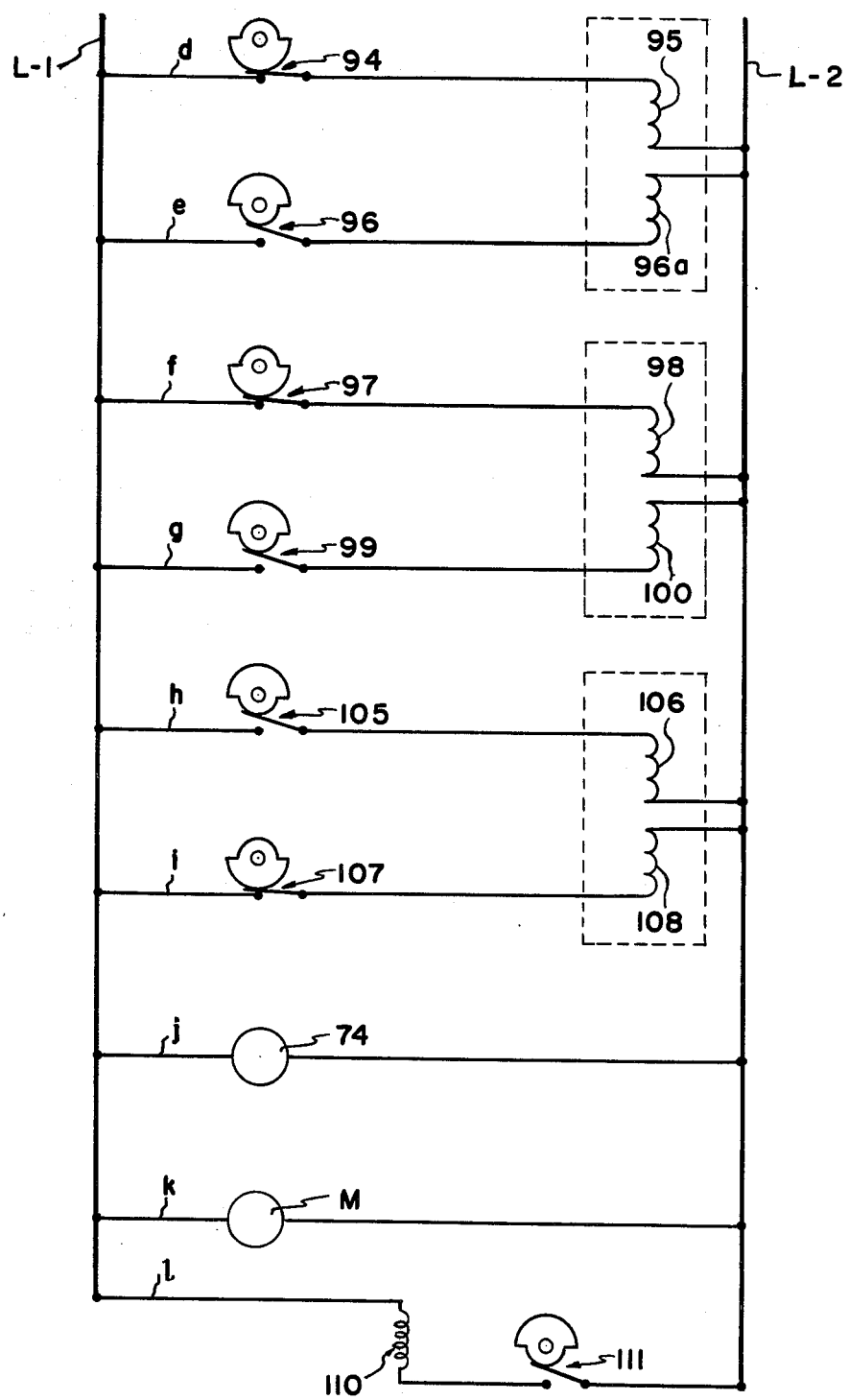
FIG. 4 is a schematic diagram illustrating an electrical circuit for controlling the apparatus, illustrated in FIGS. 1-3.

Air return ports 76 are provided in the bottom box wall 58 in alignment with channels 78 defined by the upstanding, parallel sidewalls 60 and 54. A transversely extending, sealed, air return duct 80 is provided on the underside of the box 50 and includes vertical, transversely extending sidewalls 82 end walls 83 and spanned by a bottom wall 84. The duct 80 is in fluid communication with the air return ports 76. An aperture 86 is provided in the bottom wall 84 and receives an air return duct 88 coupled to the return side of air blower 70. The blower 70 is driven via a suitable electric motor M (line h, FIG. 4).

Air is supplied, under pressure, by the blower 70 via the ducts 72 and 68 upwardly into the chamber 63. A baffle plate 85, mounted on the bottom box wall 58 via upstanding pins 91 in alignment with the opening 67, diverts the pressurized air horizontally, (arrow z) to minimize the formation of cold spots in the sheet P immediately above the opening 67. The air, diverted horizontally outwardly in the direction of the arrows z, passes upwardly through the openings 66 in the direction of the arrows y, to upwardly billow the sheet P as illustrated in FIG. 3. The air then passes laterally outwardly through the passages 61 and thence downwardly to the ports 76 to the air return ducts 80 and 88.

The fan 70 operates to draw the billowing air through the channels 78 into the ports 76 and duct 80. A "make up" air gate 73 is provided on the fan 70 to allow adequate make up air to enter the system.

Apparatus, generally designated 87, is provided for preventing the sheet P from dragging on the leading and trailing edges of the endwalls 56 including laterally extending, sheet support tubes 89 mounted at the upper edges of the front and rear upstanding end walls 56. The sheet support tubes 89 have air emitting ports or apertures along the upper edges thereof for emitting pressurized fluid which is supplied thereto via an air supply tube 90 connected to a suitable source of pressurized air, such as the blower 70. A valve 92 is connected in series with the air supply tube 90 and is controlled by a solenoid 110 (FIG. 5) for controlling the supply of air to the sheet support tubes 89. As will be described more particularly hereinafter, the solenoid 110 and the valve 92 are only operated when the sheet P is moving forwardly. The supply of heated air to the tubes 89 is interrupted when the sheet P is stationary, otherwise, the air emitted by tubes 89 might cause chilling of the overlying sheet portion being supported thereby.

THE CIRCUIT

An electrical control circuit for controlling the apparatus illustrated in FIGS. 1-3 is illustrated in FIG. 5 and includes a pair of supply lines L-1 and L-2 spanned by a plurality of parallelly connected circuit lines d through l. Circuit line d includes a timing cam operated limit switch 94 connected in series circuit with an advance solenoid 95 for moving the upper mold 14 downwardly. Circuit line e includes a cam operated switch 96 connected in series circuit with a retract solenoid 96a which retracts the mold 14 upwardly to the open position. Circuit line f includes a timing cam operated switch 97 which is connected in series circuit with an advance solenoid 98 of the lower mold operating cylinder for raising the lower mold 15 to the closed, molding position. Circuit line g includes a timing cam operated switch 99 which is connected in series circuit with a retract solenoid 100 for returning the lower mold 15 to the retracted, inoperative position. Circuit line h has a timing cam operated switch 105, which when closed, energizes a retract solenoid 106 causing the advancing movement of the sheet P via a drive rack as more particularly described in U.S. Pat. No. 3,664,791. When solenoid 106 is energized the valve 92 is also opened to direct pressurized air to the sheet support tubes 89 and prevent the sheet from dragging on the leading and trailing air box walls 56.

Circuit line i includes a timing cam operated switch 107 which, when closed, energizes the advance solenoid 108 of a fluid pressure operated cylinder for returning a sheet and chain advancing drive rack (not shown) to the starting position, as described more particularly in U.S. Pat. No. 3,664,791. The heater 74 is connected in line j. The electric motor M for driving the fan 70 is connected in line k. The solenoid 110 for directing pressurized fluid to the pressurized air emitting, longitudinally spaced, transversely extending, sheet support pipes 89 is connected in series with a normally open, cam operated switch 111 which closes when the cam operated switch 105 is closed to cause forward movement of the sheet p.

THE OPERATION

The cam operated switches 105 and 107 are intermittently opened and closed to incrementally move the plastic web P through the machine as more particularly described in U.S. Pat. No. 3,664,791. The incremental movements are followed by periods of dwell through the oven enclosure 38. The sheet is gradually heated to a forming temperature suitable to permit the mold assemblies 14 and 15 to form three dimensional articles such as containers in the sheet during the periods of sheet dwell. As the sheet P is heated to forming temperature by the radiant heaters 43 and 43', the midportion 129 of the sheet P will tend to sag. The motor M is continually operated to force air, under pressure and heated by heater 74, into the chamber 63 to support the midportion of the sheet between the sheet support chains 29 in a generally planar or slightly upwardly billowing condition.

When the cam switch 105 is opened and the dwell period starts, the time operated cam switches 94 and 97 switches are closed to move the molds 14 and 15 to the closed position and the molding commences. When the molding operation is completed, the cam operated switches 96 and 99 are closed and the cam operated switch 94 and 97 are opened to energize the solenoids 96a and 100 and move the molds 14 and 15 to the retracted positions. When the molds are retracted, the cam operated switch 105 is closed to advance the sheet P forwardly.

When the sheet P is advanced, the cam operated switch 111 is closed to emit pressurized fluid to the tubes 89 to prevent the sheet P from engaging and dragging on the front and rear box walls 56 as the sheet P moves forwardly downstream. After the sheet is indexed, the cam operated switch 111 is opened to interrupt the flow of fluid to the tubes 89 and the timing cam operated switches 94 and 97 again close and the operation is repeated.

The transfer time from the air billowing support station to the mold station MS is accomplished in a relatively short time, i.e., $\frac{1}{2}$ to $\frac{3}{4}$ seconds and thus the sheet does not unduly sag in this relatively short period. A complete forming cycle is typically 2 to 3 seconds in duration.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Differential pressure thermoforming apparatus for forming articles in a continuous sheet of thermoplastic material comprising:
   a frame having a longitudinally forward end and a rearward end;
   laterally spaced apart sheet supporting means movably mounted on said frame for supporting the lateral edges of said sheet and for incrementally longitudinally forwardly indexing said continuous sheet of thermoplastic material relative to said frame in a forward, longitudinal path of travel;
   mold means mounted on said frame (disposed) in juxtaposition with said sheet supporting means for forming articles in the sheet supported thereon;
   said mold means being movable forward and away from said sheet between a retract position and a sheet engaging position;
   heating means, disposed on said frame upstream of said mold means for heating said sheet to forming temperature; and
   means, stationarily mounted on said frame upstream of said mold means, for upwardly directing pressurized fluid between said sheet supporting means to support the midportion of said heated sheet upstream of said mold means at a level spaced from the level of said mold means in said retract position and inhibit sagging of the midportion of said sheet under its own weight as said sheet moves relative thereto from said heating means to said mold means.

2. The apparatus as set forth in claim 1 wherein one of said mold means includes a mold cavity and the other of said mold means includes a male plug assist member engageable with one side of said sheet and being receivable by said mold cavity when said upper and lower mold means are in said sheet engaging position;
    said means for upwardly directing pressurized fluid comprising:
    means for maintaining the temperature of the said one side of said sheet at a slightly lower temperature than the temperature of the other side of said sheet to form a cooler skin on the said one side of the sheet to be engaged by said plug assist member;
    said temperature maintaining means comprising means for directing fluid against said one side of said sheet, and means for maintaining the temperature of the fluid slightly below said forming temperature.

3. The apparatus as set forth in claim 2 wherein said temperature maintaining means comprises a recirculating air, sheet support box disposed upstream of said mold means; said temperature maintaining means comprising means for directing pressurized fluid into said box; and means for maintaining the temperature of the air in said air box below said forming temperature.

4. The apparatus as set forth in claim 3 wherein means is connected with said box to remove the air from the box, reheat the removed air, and return the heated air to the box.

5. The apparatus set forth in claim 1 wherein said mold means comprises openable and closable mold members; said indexing means being operative to incrementally move said sheet in a path between said mold members; said means for operating said indexing means and mold members in timed relation such that said indexing means will index said sheet only when the mold members are opened.

6. The apparatus as set forth in claim 1 wherein said means for directing pressurized fluid comprises an open top, fluid receiving box having a midportion to which sheet supporting fluid is admitted and passes in an upward direction to upwardly billow the midportion of the sheet above said box as the sheet moves past said box and a fluid return portion at the edge of said box for exiting the billowing fluid.

7. The apparatus as set forth in claim 1 including means for heating said fluid to a temperature slightly below the forming temperature of the plastic sheet.

8. The apparatus as set forth in claim 1 wherein said mold means comprises upper and lower molds relatively movable toward and away from each other between open and closed positions, said upper mold having a mold cavity and said lower mold having a male plug assist member receivable in said cavity when said upper and lower molds are in said closed positions, means for maintaining the temperature of said pressurized fluid slightly below the temperature to which the sheet had been heated by said heating means to form a cooler skin on the underside of said sheet.

9. Differential pressure thermoforming apparatus for forming articles in a continuous sheet of thermoplastic material comprising:
    a frame having a longitudinal forward end and a rearward end;
    heating means, disposed on said frame, for heating a portion of said sheet to forming temperature;
    mold means, mounted on said frame downstream of said heating means, for differential pressure forming articles in the heated portion of said sheet at a mold station;
    said mold means being movable between a retract position and a sheet engaging position;
    laterally spaced apart sheet supporting means movably mounted on said frame, for supporting the lateral edges of said sheet and for incrementally longitudinally forwardly indexing said continuous sheet relative to said frame in a forward, longitudinal path of travel to successively move said sheet from said heating means to said mold station; and
    means, stationarily mounted on said frame upstream of said mold means, for upwardly directing pressurized fluid between said sheet supporting means toward the midportion of said sheet between said sheet support means to support the midportion of said heated sheet upstream of said mold means at a level spaced from the level of said mold means in said retract position and inhibit sagging of said sheet midportion under its own weight as said sheet moves relative thereto from said heating means to said mold means.

10. Differential pressure thermoforming apparatus for forming articles in a continuous sheet of thermoplastic material comprising:
    a frame having a longitudinally forward end and a rearward end;
    heating means mounted on said frame for heating said sheet to forming temperature;
    mold means, mounted on said frame for movement between retract and mold positions, for differential pressure forming articles in the heated sheet;
    billowing means, mounted on said frame upstream of said mold means, for upwardly billowing a portion of said continuous sheet disposed between said heating means and said mold means;
    laterally spaced apart, sheet supporting means, movably mounted on said frame, for supporting the lateral edges of said sheet and for incrementally longitudinally forwardly indexing said continuous sheet in successive increments relative to said frame and said billowing means from said heating means to said mold means, in said retract position, in a forward, longitudinal path of travel; and
    means for admitting pressurized fluid to said billowing means and upwardly directing said pressurized fluid between said sheet supporting means to upwardly billow the midportion of the sheet above said billowing means as said sheet moves past said billowing means to a level spaced from the level of said mold means in said retract position.

11. The apparatus set forth in claim 10 wherein said billowing means comprises an open top, fluid receiving hollow box having a fluid receiving opening at its midportion.

* * * * *

UNITED STATES PATENT OFFICE
CERTIFICATE OF CORRECTION

Patent No. 4,101,252                    Dated July 18, 1978

Inventor(s)  GAYLORD WILLIAM BROWN

It is certified that error appears in the above-identified patent and that said Letters Patent are hereby corrected as shown below:

In col.1 on the page of the patent including the "Abstract" in lines 4 and 5, after "Sweetheart Plastics, Inc." delete -- Beaverton, Michigan -- and insert -- Guildware Park, Wilmington, MA 01887. --

Signed and Sealed this

Twentieth Day of March 1979

[SEAL]

Attest:

RUTH C. MASON
Attesting Officer

DONALD W. BANNER
Commissioner of Patents and Trademarks